(12) United States Patent
Allen

(10) Patent No.: US 9,864,617 B1
(45) Date of Patent: Jan. 9, 2018

(54) COMPOSABLE MACHINE IMAGE

(71) Applicant: Amazon Technologies, Inc., Seattle, WA (US)

(72) Inventor: Nicholas Alexander Allen, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/629,459

(22) Filed: Feb. 23, 2015

Related U.S. Application Data

(63) Continuation of application No. 13/332,175, filed on Dec. 20, 2011, now Pat. No. 8,966,021.

(51) Int. Cl.
*G06F 15/173* (2006.01)
*G06F 9/455* (2006.01)

(52) U.S. Cl.
CPC .............................. *G06F 9/45533* (2013.01)

(58) Field of Classification Search
None
See application file for complete search history.

(56) References Cited

U.S. PATENT DOCUMENTS

| | | | |
|---|---|---|---|
| 2003/0074252 A1* | 4/2003 | Chandler-Pepelnjak | G06Q 30/02 705/14.53 |
| 2006/0031425 A1* | 2/2006 | Nelson | G06F 8/63 709/220 |
| 2009/0257595 A1* | 10/2009 | de Cesare | G06F 21/575 380/277 |
| 2009/0292587 A1* | 11/2009 | Fitzgerald | G06Q 30/02 705/7.29 |
| 2009/0300057 A1* | 12/2009 | Friedman | G06F 11/3664 |
| 2009/0300151 A1* | 12/2009 | Friedman | G06F 11/3664 709/222 |
| 2010/0037206 A1 | 2/2010 | Larimore et al. | |
| 2011/0107112 A1 | 5/2011 | Resch | |
| 2011/0246778 A1 | 10/2011 | Duane | |
| 2012/0084133 A1* | 4/2012 | Ross | G06F 11/3438 705/14.27 |
| 2013/0145022 A1* | 6/2013 | Srivastava | G06Q 30/0241 709/224 |

* cited by examiner

*Primary Examiner* — Natisha Cox
(74) *Attorney, Agent, or Firm* — Baker & Hostetler LLP

(57) ABSTRACT

A computer system image is executed on a computing node over a network. A system specification file transmitted over the network specifies the computer system image by specifying components of the computer system image. The components include an operating system and at least one resource. The system specification file also contains a signature associated with the resource. A resource is determined to be authorized to be incorporated into the computer system image by verifying the signature. A computer system image can then be formed based on the components specified by the system specification file and executed locally.

20 Claims, 5 Drawing Sheets

US 9,864,617 B1

COMPOSABLE MACHINE IMAGE

CROSS REFERENCE TO RELATED APPLICATIONS

This application claims priority to U.S. patent application Ser. No. 13/332,175 filed on Dec. 20, 2011 the contents of which are hereby incorporated in their entireties.

BACKGROUND

Companies and organizations operate computer networks that interconnect numerous computing systems to support their operations. The computing systems can be located in a single geographical location (e.g., as part of a local network) or located in multiple distinct geographical locations (e.g., connected via one or more private or public intermediate networks). Data centers may house significant numbers of interconnected computing systems, such as, e.g., private data centers operated by a single organization and public data centers operated by third parties to provide computing resources to customers. Public and private data centers may provide network access, power, hardware resources (e.g., computing and storage), and secure installation facilities for hardware owned by the data center, an organization, or by other customers.

To facilitate increased utilization of data center resources, virtualization technologies may allow a single physical computing machine to host one or more instances of virtual machines that appear and operate as independent computer machines to a connected computer user. With virtualization, the single physical computing device can create, maintain or delete virtual machines in a dynamic manner. As a result, the ability to move computing resources from one location to another is becoming an increasingly important aspect of providing computing resources to customers.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF ILLUSTRATIVE EMBODIMENTS

Embodiments of systems and methods are described for transferring images of computing systems among computing devices. In one example, computer system images are transferred in the form of binary images. In that case, the binary image may contain a base image, e.g., an operating system, along with various resources such as application programs that are in a form that is executable on a computing device. In an embodiment, a user can select a binary image from a set of predefined systems. For example, the user may select a computer system image for execution from among a catalog of preconfigured systems or a user may prepare a specific system configuration for replication to other users. In the former case, a user may select a computing system design prepared by another user. In the latter case, a user may prepare a computing system design for replication to a predefined group of other users, such as a group of employees in a company.

Typically, when a binary image is replicated, it is transmitted across a network and copied to a destination computing node for execution. The computing node may be a physical computing device or a virtual computing device. However, if the binary image file is large, the process of copying across the network consumes both time and network bandwidth. As such, rather than transmitting the binary image itself, the system specification file may then be transmitted to a second computing system for generation of the binary image at the second computing system. In this manner, the specified binary image can be recreated at the second computing system without requiring the transmission of the binary image across a network.

Various aspects of the disclosure will now be described with regard to certain examples and embodiments, which are intended to illustrate but not to limit the disclosure.

Figure 1:
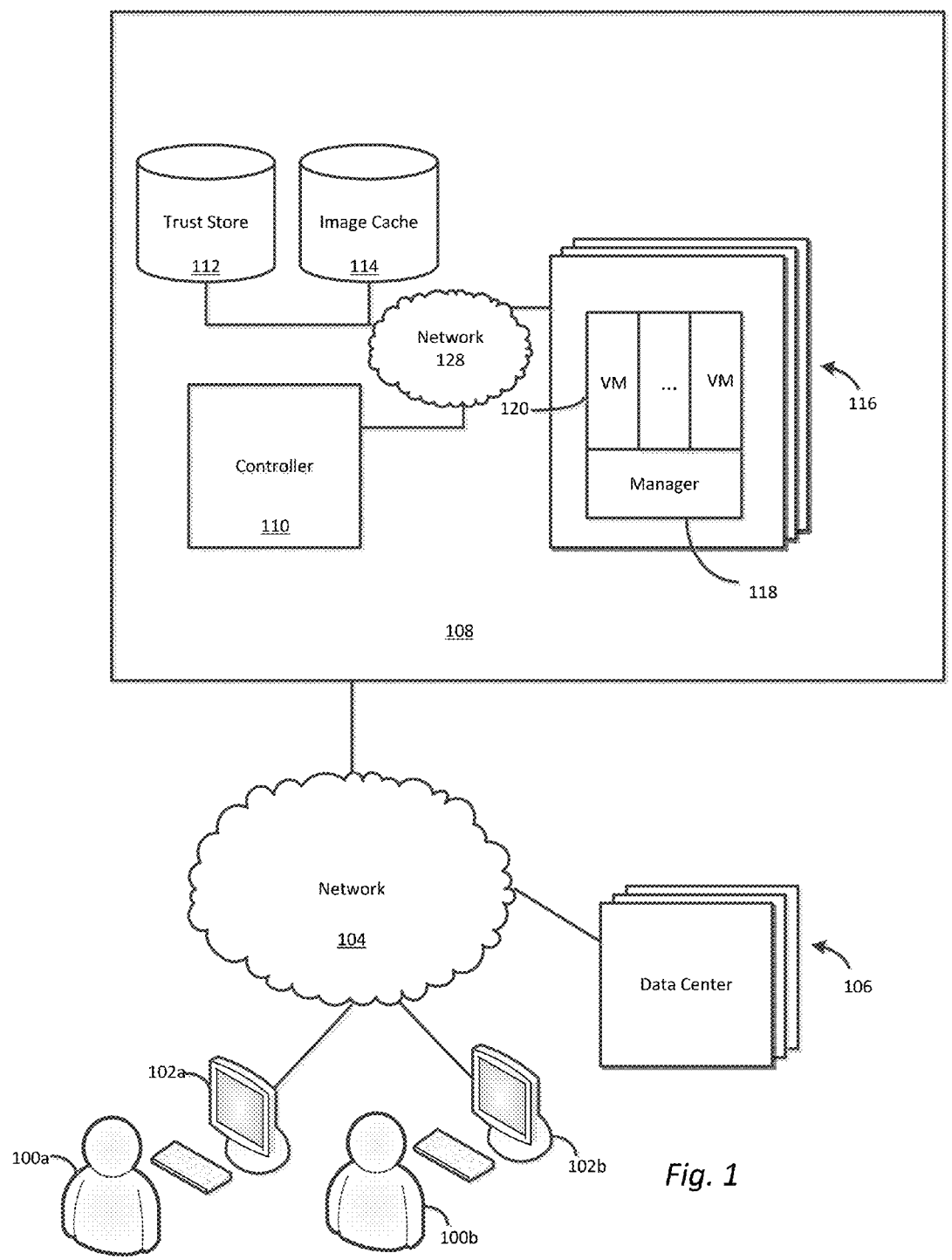
FIG. 1 illustrates a system in which one or more users access computing resources.

FIG. 1 is a diagram schematically illustrating an example of a program execution service 108 that can provide computing resources to multiple user 100 by way of computing systems 116 via a communication network 104. For example, the program execution service 108 can manage requests from a user to execute a program, or set of programs, on behalf of the user. At least some of the user computing systems 116 may be remote from the program execution service 108. In this example, users can use the computing systems 104 to access the program execution service 108 over the communication network 104. The network 104 may, for example, be a publicly accessible network of linked networks, possibly operated by various distinct parties, such as the Internet. In other embodiments, the network 104 may be a private network, such as, for example, a corporate or university network that is wholly or partially inaccessible to non-privileged users. In still other embodiments, the network 104 may include one or more private networks with access to and/or from the Internet.

The program execution service 108 provides a variety of functionality for managing execution of programs for multiple users 100. In the example illustrated in FIG. 1, the program execution service 108 comprises a plurality of physical computing devices 116 that can provide computer processing resources. The program execution service 108 can provide the computer processor resources to a user in the form of computing nodes. Each computing node can be either a physical machine (e.g., one of the physical computing devices 116) or in the form of one or more virtual machines ("VM") 120 that are hosted on one or more of the physical computing systems 116. For example, a host computing system may provide multiple virtual machines 120 on a single physical machine and include a virtual machine manager 118 to manage those virtual machines (e.g., a hypervisor or other virtual machine monitor).

In the example illustrated in FIG. 1, each of the computing nodes 120 has some amount of computing resources available for executing one or more programs. Each computing node 120 may be configured to provide a specific amount of program execution capacity, including, for example, a combination of processing capacity (e.g., number and/or size of processing units), memory capacity, storage capacity, network bandwidth capacity, non-network communication bandwidth, etc.

In some embodiments, the program execution service 108 may provide preconfigured computing nodes 120, with each preconfigured computing node having similar and/or equivalent amounts of resources available for executing programs on behalf of users. In other embodiments, the program execution service 108 may provide a selection of various different computing nodes 120 from which a user may choose for executing programs on behalf of the user. In some such embodiments, the computing nodes 120 may have varying amounts and/or types of computing resources (e.g., size, speed and/or type of processing units; number of processing units; amount of memory and/or storage; platform configuration, such as 32-bit or 64-bit, operating system, etc.).

The program execution service 108 may store preconfigured computing system images in an image cache in one or more storage nodes 114. The predefined computing system images contain a base image including an operating system and one or more resources such as an application or applications. The image cache 114 may comprise any type of persistent data storage, for example non-volatile memory devices such as, e.g., hard disk drives, optical disk drives, etc. In the example illustrated in FIG. 1, the computing nodes 120 can access the image cache 114 via a network. The network may include multiple networking devices (not shown) such as, e.g., switches, edge routers, core routers, etc. The network may, but need not be, a different network than the network 104 shown in FIG. 1.

Users of the program execution service 108 can interact with the program execution service 108 via a request to controller 110. Controller 110 controls access to the computing nodes 120 and may perform load balancing and the like of the computing nodes among users of the program execution service. The controller 110 can be connected to the computing nodes 120 via the network 128. The controller 110 can receive requests for availability of resources from the user computing systems 102 over the network 104. A user may request via the controller 110 that the service 108 provide one or more computing nodes for execution of a program (or programs) on behalf of the user (or other users authorized by the user). In various embodiments, computing resources may be specified at the time of a request for execution of programs on behalf of a user and/or at one or more other times, such as when a user registers and/or subscribes to use services of the program execution service 108. In some embodiments, the controller 110 may provide subscription and/or registration services to one or more users, such that users may specify information related to one or more programs to execute on behalf of a user (e.g., programs, source code, addressable locations of one or more programs, etc.), account information (e.g., user name, billing information, etc.), terms of use, etc. In some embodiments, after a user interacts with the capacity request manager 110 to subscribe and/or register for services, the user may be issued one or more request identifiers (e.g., keys, tokens, user names, passwords, etc.) that are associated with the user and are to be used in conjunction with executing programs on behalf of the user. In other embodiments, a module other than the controller 110 may be provided to perform various operations related to subscription and/or registration services of the program execution service 108.

In some embodiments, the controller 110 is executed or embodied by one or more physical or virtual computing systems. For example, in some embodiments, a server computing system that has components including a CPU, I/O components, storage, and memory may be used to execute the controller 110. The I/O components include a display, a network connection, a computer-readable media drive, and other I/O devices (e.g., a keyboard, a mouse, speakers, etc.). An embodiment of the controller 110 can be stored as one or more executable program modules in the memory of the server, and the controller 110 can interact with computing nodes 120 (e.g., physical computing systems 116 and/or VMs 120) over the network. The controller 110 can receive requests from users for computing resources of the program execution environment 108 via the network 104.

In some embodiments, the program execution environment 108 may be hosted in one or more data centers 106. Data centers 106 may be geographically dispersed and may each host a service that is the same as or similar to program execution environment 108. In some embodiments, a user 100 may be associated with program execution environment 108 that is hosted in a data center 106 that is selected based on load balancing, geography, or other criteria. For example, a data center 106 that is geographically proximate to the user's computing device 102 may provide for a more responsive user experience. In some instances, a computing system that is selected for operation by a user in communication with program execution environment 108 and data centers 106 may be transferred from one of the data centers 106 to a computing node in program execution environment 108 over network 104.

According to an embodiment, the transfer of the computing system may take the form of a system specification file. In such an embodiment, the amount of data transferred over network 104 is substantially reduced. Moreover, the integrity of the computing system that is ultimately executed on computing node 120 in program execution environment 108 may be more readily determined as described more fully herein.

Figure 2:
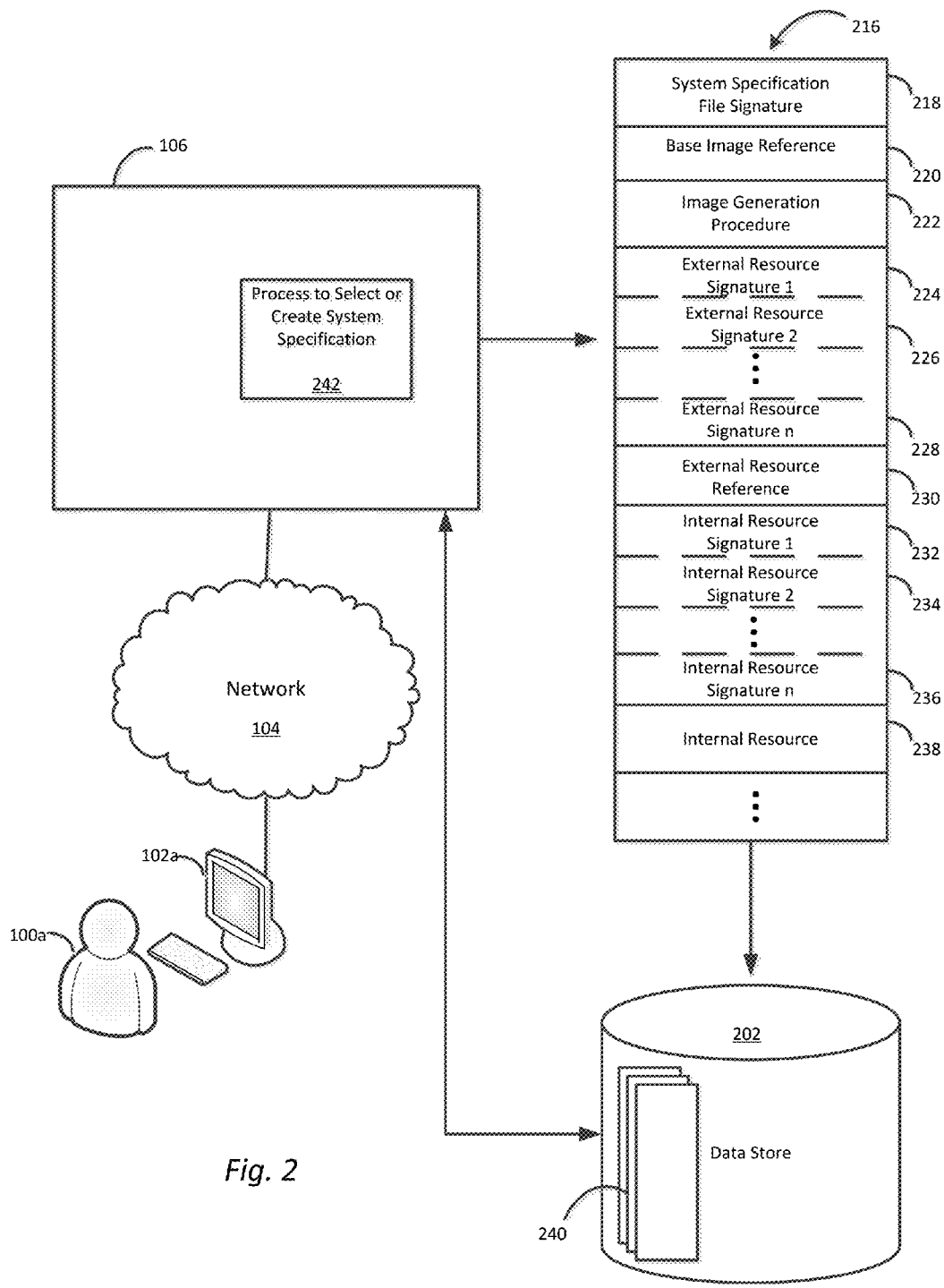
FIG. 2 illustrates a user selection of a system specification file.

FIG. 2 is a schematic illustration of further details of an example system specification file 216 as well as a process for the generation of a system specification file 216. In an example embodiment, a user 100a, interacts with a computing service, e.g., process 242, within a data center 106. In the example, process 242 enables user 100a to select a preexisting system specification file 240 from data store 202 that can be used to create a binary image of a computing system for operation on a computing node 120 that may be hosted in a program execution environment 108.

A user 100a may be interested in selecting a system specification file 216 created by another user for any number of reasons. For example, user 100a may be interested in creating a computer system similar to the computer system of the other user, e.g., 100b. In that case, user 100a can select a system specification file 216 that is used to prepare a copy of a computer system image in data center 106 that is substantially the same as a computer system image used by user 100b in a data center that is located in a location that is separated from data center 106 by a network, e.g., network 104. Moreover, users, e.g., 100a and 100b, can create system specification files 216 and post them on a computer system that is accessible by other users who could search and or browse for a system specification file 216 of interest and use a selected system specification file 216 to prepare a computer system image on a computing node 120 that is accessible by the particular user. One example of such as system for sharing system specification files 216 is an application or system market place environment in which users can select system specification files 216 that suit their needs. To facilitate a user's ability to locate system specification files 216 of interest, a market place environment may further classify specific system specification files 216, for example, as financial related, engineering related, legal related, and so on. The market place environment may also impose controls on which users can access particular system specification files 216, e.g., limited to specific user groups or enterprises, and how various users can access particular system specification files 216, e.g., by paying a fee. As such, users, e.g., 100a in the example of FIG. 2, may use the market place, or other file sharing system, to find a system specification file 216 of particular interest and to prepare a binary computer system image.

User 100a may create a system specification file 216 instead of selecting a preexisting system specification file 240. System specification file 216 provides a secure mechanism for defining components that can be used to construct a binary computer system image.

System specification file 216 can take many forms within the spirit what is described herein. Moreover, the order of the components and the format of the information within the file can take many forms. For example, the information can be in the form of text, binary, or some combination of text and binary. The text could be plain text or coded text that must be further processed to determine its meaning, e.g., through a look up table or a dictionary.

System specification file 216 also may comprise specification file signature 218. System specification file signature 218 provides a mechanism that ensures that the integrity of system specification file 216 has not been compromised. In an embodiment, system specification file signature 218 is applied after the entire system specification file 216 has been populated and is otherwise complete. Thereafter, system specification file 216 may be hashed and the hash signed with the private key of the user that created the file or by the private key of a signing authority. When the system specification file 216 is later retrieved for use, system specification file signature 218 can be decrypted using the corresponding public key to recover the original hash value. The original has value can then be compared to a newly computed hash value of system specification file 216. A mismatch indicates that system specification file 216 has been corrupted or otherwise compromised, whereas a match indicates that system specification file 216 is not corrupted or compromised.

System specification file 216 also contains a base image reference 220. The base image reference 220 can indicate, for example, an operating system and version of the operating system that will be the base image of the system. For example, base image reference 220 may provide an indication that the operating system should be Linux version 4.1.2. Of course the reference may be in plain text, a pointer to a storage location that provides a cross reference to the operating system and version, a coded reference, etc.

In an embodiment, system specification file 216 may also contain an image generation procedure 222 that can be used with a configuration management tool such as Puppet, Chef, cfengine, etc. to generate the specific base image from the operating system install. The image generation procedure can be included directly in system specification file 216, for example, or be located elsewhere and retrieved based on information included in system specification file 216.

System specification file 216 may also contain a number of resources that are installed on the base image. For example, system specification file 216 may also include a reference to a particular database management system that is to be used with the base image reference. For example, a particular version of Oracle database management software may be a resource that a user, e.g., 100, wants to have installed on computing node 120 running the base image. In another example, the resource may be a script file that should be run on the base image to apply configuration settings to computing node 120 on which the base system image is running. As such, a reference may be either an external or an internal resource. An external resource is one in which the resource is not included in system specification file 216. For example, the Oracle database management system is not included in system specification file 216. Instead, system specification file 216 contains a reference to a location from which the Oracle database management system can be retrieved and installed. In the example of FIG. 2, an external reference resource is indicated by section 230 of system specification file 216. An internal resource may be for example a script file that is included within system specification file 216 and is indicated in the example of FIG. 2 by section 238. System specification file 216 may contain one or more external resource references and may also contain one or more internal resources.

In an embodiment, each resource (e.g., 230, 238) may have associated with it, one or more signatures. In the example illustration of FIG. 2, the one or more associated signatures for external resource reference 230 includes External Resource Signature 1 224, External Resource Signature 2 226, and External Resource Signature n 228. For Internal Resource 238, the associated signatures include Internal Resource Signature 1 232, Internal Resource 2 234, Internal Resource Signature n 236.

In an embodiment and as described above, there may be multiple signatures associated with each resource. In an example, a user, group of users, organization, or other entity that use system specification file 216 may determine to rely on one set of signatures, whereas a different user, group of users, organization, or entity may rely on a separate set of signatures. In another embodiment a user, group of users, organization or entity may rely on multiple signatures. Indicators of the trustworthiness of the signatures may be maintained by a trust store (e.g., trust store 112 of FIG. 1) and can be used to determine whether a particular resource is validated.

In an embodiment, signatures may be calculated from a portion of system specification file 216 and a public key infrastructure such as an X.509 certificate. For example, an organization may author a portion of system specification file 216, e.g., internal resource 238, and calculate a signature for the portion of system specification file 216 by, for example, cryptographically signing a SHA1 hash of the portion of system specification file 216 using the certificate private key. In such an embodiment, the signature could be used to demonstrate the authenticity of the portion of system specification file 216 to facilitate detection of forgery or tampering.

In an embodiment, the signature may be a null or otherwise indicate that the resource is an unsigned resource. A null or other indicator may be used as an indicator that user intervention is required as described more fully herein.

As illustrated by FIG. 2, process 242 provides a user with an option of selecting a pre-existing system specification file 240 from data store 202 or creating a system specification file 216. Process 242 is illustrated in this embodiment as providing a user 100a with an option of either selecting a system specification file 240 or creating a system specification file 216. The optional processes of process 242 may be completely distinct in that a user may access one computing environment or data center 106 to select an existing system specification file 240 and a different computing environment or data center 106 to create a system specification file 216. The processes are illustrated together here as process 242 for the sake of simplicity and ease of explanation.

In the process of process 242 wherein user 100a selects a preexisting system specification file 240, the user may be presented with a selection process in a marketplace environment in which a user can log in and search for or browse for system specification files 240 that can be used to generate a computer system that meets the user's needs for launch or execution on a computing node 120. In such a case, the user would select a particular system specification file 240 from the marketplace environment and request that execution of a corresponding system on a computing node 120 in a program execution environment 108 as is explained more fully herein below with respect to FIGS. 4 through 5.

Figure 3:
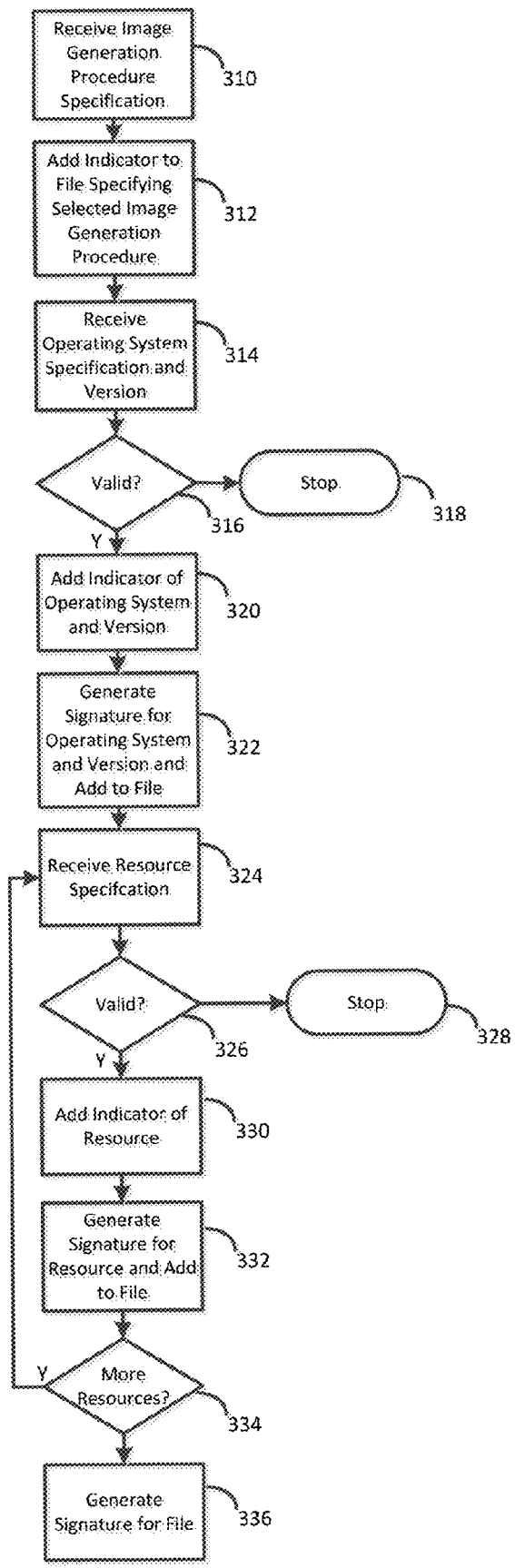
FIG. 3 is a flowchart depicting an example procedure for creating a system specification file.

In the case where the user opts to create a system specification file 216, an example flow chart demonstrating one example of how such a process could be implemented is described with respect to FIG. 3. In some implementations, the routine can be provided by embodiments of process 242 of FIG. 2. The example flow chart of FIG. 3 is described in terms of a user that makes a request to create a system specification file 216. The example flow chart is intended to illustrate, but not to limit, various aspects of the process. For example, the specific order of the blocks of the flow chart can be reconfigured in any suitable manner or various blocks can be combined or further refined.

With reference to FIG. 3, after the user selects the option to create a system specification file 216, at block 310, an image generation procedure specification is received from the user. The image generation procedure i.e., the instructions that can be processed by a configuration management tool such as Puppet, Chef, cfengine, etc., can be specified within system specification file 216 to generate the specific base image from the operating system install as described above. After the image generation procedure is specified by the user, an indicator can be added to the file or specific instructions can be added to the file at block 312.

At block 314, an operating system specification and version is received from the user. The operating system specified by the user and version number can be checked at block 316. If the specified operating system is valid, the process continues. Otherwise, the process stops at block 318. If the process continues, then an indicator of the operating system and version are added to the system specification file at block 320. The operating system and version that are specified can later be used to generate the base system image. In an embodiment, a signature for the operating system and version can be generated and added to the file at block 322.

After specifying the operating system and version, the system continues to add resources to system specification file 216. In an embodiment, the process loops through specifying resources, generating signatures, and adding resources and signatures to system specification file 216. For example, at block 324, the user specifies a resource. In one aspect, the resource can be specified as an external resource. In that case, the file will contain a reference to the resource so that the resource can be retrieved when the system image is generated. In another aspect, the resource can be internal. In that case, the resource can be added directly to the system specification file. At block 326, the resource is checked for validity. The validity check can comprise a check to determine if the specified resource is compatible with the operating system, a legitimate program that is authorized to be added to a system image, and so on. If the resource specified in not valid, then the process stops at block 328.

If the resource is determined to be valid, then an indicator is added to system specification file 216 at block 330. In the case where the resource is an internal resource then the resource can be added directly to the file in block 330. For example, the resource may include a set of commands or instructions to be applied to the operating system to configure the operating system after installation. The image generation procedure may be amended to incorporate the set of commands or instructions. After the resource or an indicator of the resource is added to the system specification file at block 330, a signature can be generated for the resource and added to system specification file 216 at block 332. Although the flow chart illustrates a single signature generation at block 332, in an embodiment, multiple signatures can be added to system specification file 216 for a given resource. In the embodiment wherein a plurality of signatures are added to system specification file 216, different users of the system specification file may rely on different trust authorities to validate a particular signature and thereby a resource. That process is described in further detail below.

At block 334, a determination is made whether additional signatures should be added to system specification file 216. If additional resources are to be added to system specification file 216, the process loops back to block 324 so that the process of adding additional resources can be repeated. When the process of adding resources is complete and system specification file 216 is completed, a signature for the entire contents of system specification file 216 can be generated and associated with system specification file 216. Such a signature can be generated, for example, by use of a hash function such as SHA-1. The hash can be signed with the private key of a trusted authority. As such, the integrity of system specification file 216 can be determined when system specification file 216 is later used to generate a binary system image for execution on a computing node 120.

After the creation of a system specification file 216 as described above with respect to FIG. 3, system specification file 216 optionally can be made available to other users by, for example, adding system specification file 216 to data store 202 and making reference to the availability of system specification file 216 in a marketplace environment as described above.

Referring back briefly to FIGS. 1 and 2, a user 100b (i.e., a potentially different user different from user 100a who created system specification file 216) may access data store 202 in a data center 106 (shown in FIG. 2) or other computing facility via network 104. To that end, user 100b may select a system specification file 216 among system specification files 240 (after the creation and storage of system specification file 216 it becomes available among the plurality of system specification files 240 stored within data store 202) for launching of a computing system image on a computing node 120 in program execution environment 108. As shown in the example described herein, the data store 202 is located in a data center 106 that is connected to program execution environment 108 by way of network 104. As such, system specification file 216 is transmitted across network 104 and is used to generate a binary system image in program execution environment 108.

By transmitting system specification file 216 across network 104 and generating the binary image file in program execution environment 108, the need to transmit large amounts of data associated with the binary image file is reduced. Moreover, by generating the binary system image in program execution environment 108 (i.e., the environment in which it will execute), a higher confidence in the integrity of the system can be attained. Because the binary system image was created on location from various resources and other components that are each trusted and verified individually, a high confidence in the integrity of the resulting binary system image file may be obtained. In particular, by describing the binary machine image to be created using a system specification file 216 and verifying the signatures contained within it, program execution environment 108 can provide a level of security to a user of the resulting computing node 120 that the computing node is free of malware, viruses, Trojans, and other undesirable computer instructions that may otherwise be embedded in a binary image that are difficult to detect.

Figure 4:
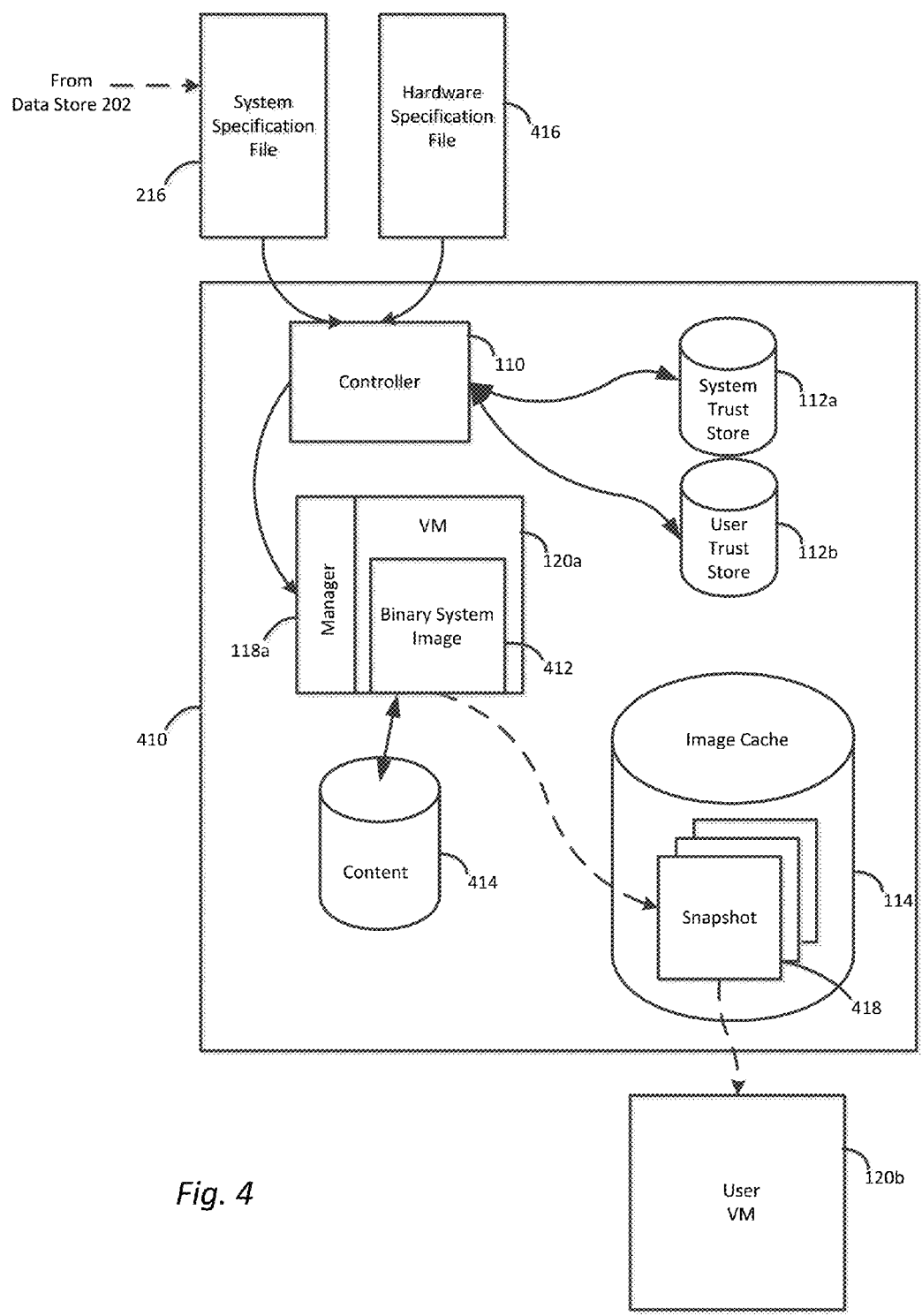
FIG. 4 illustrates a system for generating a binary computing image from a system specification file.

Turning now to FIG. 4, an image generation environment 410 is described for launching a computing node 120 from system specification file 216 in accordance with an embodiment. Image generation system 410 may be instantiated within a program execution environment 108 as described with respect to FIG. 1. Moreover, program execution environment 108 may itself be replicated in various computing environments. For example, various instances of a program execution environment corresponding to or similar to the program execution environment 108 may be instantiated in data centers 106. With respect to the image generation environment 410, controller 110 of FIG. 4 may correspond to controller 110 of FIG. 1 and VMs 120*a* and 120*b* may be instances of VMs 120 in program execution environment 108 of FIG. 1. Manager 118*a* may correspond to an instance of manger 118 of FIG. 1. Similarly image cache 114 may correspond to the image cache 114 of FIG. 1. System trust store 112*a* and user trust store 112*b* may correspond to instances of trust store 112 from program execution environment 108 of FIG. 1.

After a user selects a system specification file 216 to launch as described above, system specification file 216 is received from data store 202 by image generation environment 410. System specification file 216 may also require a hardware specification file 416 that specifies the hardware requirements upon which the binary system image generate from system specification file 216 can execute. That is, hardware specification file 416 may be used to select or configure a computing node 120*b* upon which the binary system image may be launched. Hardware specification file 416 can be selected or generated based on a number of factors. In particular, image generation environment 410 can derive the specific minimum hardware requirements necessary to execute a binary image generated from system specification file 216.

The minimum hardware requirements may affect the system performance experienced by the user. As such, in an embodiment, the user can be given an option to increase the hardware specification above the minimum requirements based on performance criteria. After determining the hardware specification by derivation and/or user input, a hardware specification file 416 can be defined and provided to image generation environment 410. Controller 110 may thereafter start the process of preparing a system image either by using its own computational resources or by using other computing resource available to image generation environment 410, e.g., by starting up a virtual machine within the program execution environment 108 to carry out the image generation on its behalf. Nevertheless, the image generation will proceed as described in more detail with respect to the process describe with respect to FIG. 5. In the meantime, continuing with the description of the image generation environment of FIG. 4, the image generation environment, prepares a virtual machine 120*a* with the attributes required by hardware specification file 416 in order to start generating the binary system image 412. As noted, image generation environment 410 is one embodiment of the image generation system. In this embodiment, the environment is described with respect to the use of virtual machines. In another embodiment, the image generation process is also applicable to an environment that employs physical machines, virtual machines, or a combination of physical and virtual machines.

After deploying virtual machine 120*a* in accordance with hardware specification file 416, system specification file 216 is parsed and processed in order to generate a binary system image 412, corresponding to the system specified in system specification file 216. The various signatures contained with system specification file 216 can be verified against system trust store 112*a* and user trust store 112*b*. As described more fully herein, upon determining that the signatures are valid the various resources can be applied to virtual machine 120*a* to complete the image generation. To that end, various resources as indicated within system specification file 216 can be stored in content store 414 and made available to VM 120*a* for installation on base image 412 to create the complete binary system image. In other words, after the installation of the base system image, some or all of the remaining resource can be installed by instructions executed from within the operating system within base system image 412. After completion of the binary system image creation, image generation environment 410 can take a snapshot of the binary system image and store it in image cache 114.

In an embodiment, the resulting snapshot 418 of the binary system image that is contained in image cache 114 is created within program execution environment 108. Moreover, the resources used to generate the binary system image have been verified by way of trust stores 112*a* and 112*b*. As such, a high level of confidence in the integrity of the execution of the binary system image results. Snapshot 418 in image cache 114 can then be replicated to a user VM 120*b* or a physical computing device for use by a user of program execution environment 108.

An embodiment of the general process described above may be used to deliver computing systems on demand to program execution environments 108 operating within data centers 106 including a cloud infrastructure, corporate networks, small businesses, and even to deliver installation on local user computing devices on an edge of a network. In such a case, it may be preferable that at least a portion of image generation environment 410 be replicated proximate to a location the target computing node.

Figure 5:
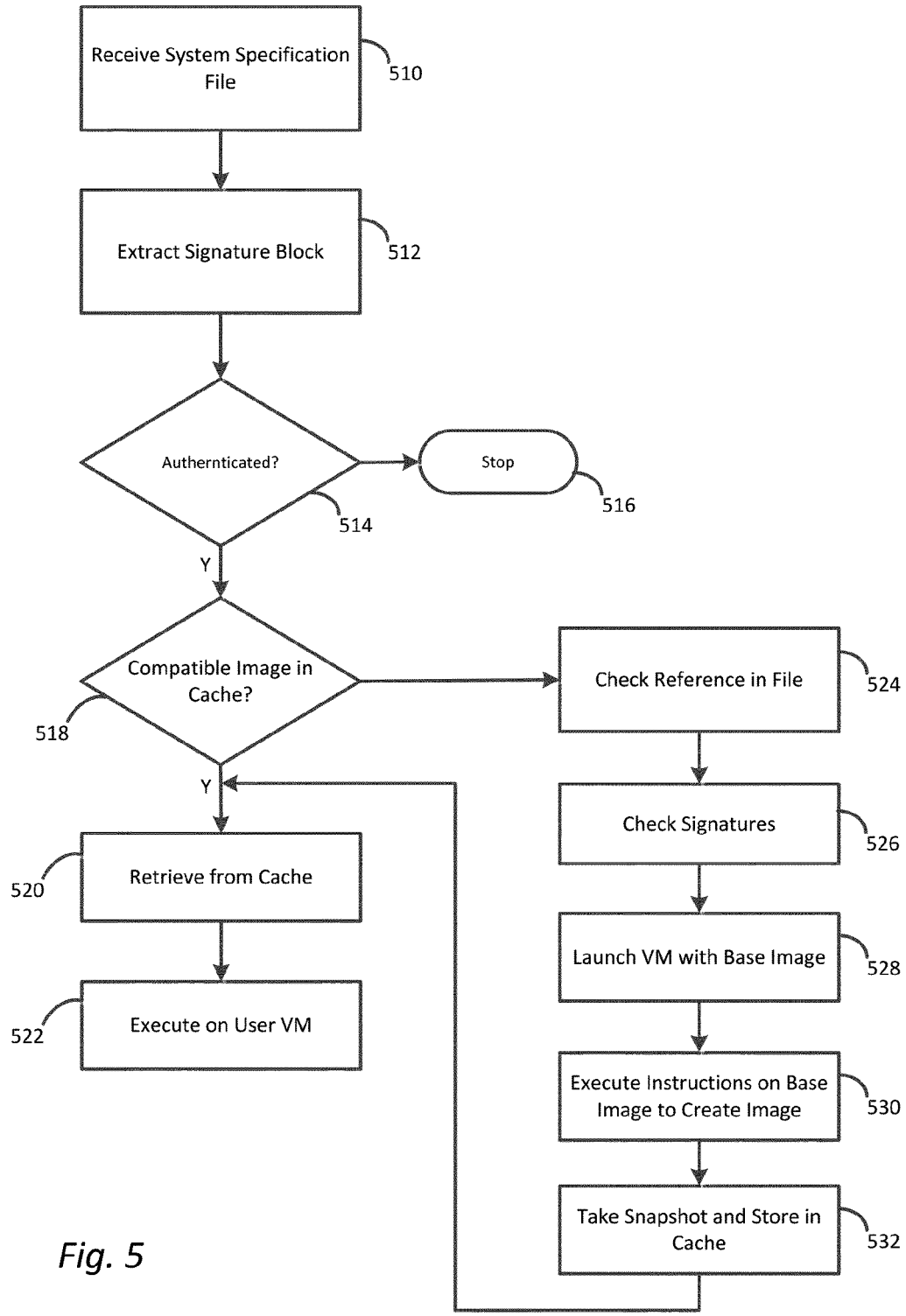
FIG. 5 is a flowchart that schematically illustrates an example embodiment of a process for executing a computer.

Turning now to FIG. 5 in conjunction with FIG. 4, an embodiment of the process of the image generation environment 410 is described with respect to the flow chart. At block 510, system specification file 216 is received. As noted above, this may be received by the controller 110 or a computing node designated by controller 110 to process a user request. In one embodiment, controller 110 designates a computing node, e.g., a computing node 120 as illustrated in FIG. 1 to process a user request in accordance with a process as illustrated in FIG. 5. Controller 110 may then return to the user an IP address of the designated computing node. Subsequent processing may then be handed off from the controller 110 to the user and the designated computing node, e.g., 120.

For ease of description, the process of FIG. 5 will be described with respect to processing and interaction between a user 110 (that is a user by way of a computing device 102)

and a computing node 120. As such, at block 510, computing node 120 receives system specification file 216. The signature block associated with the entire system specification file 216 is then extracted at block 512. After extracting the signature block, system specification file 216 is authenticated at block 514 using the extracted signature block. The authentication can occur in accordance with generally know principles of public and private key encryption as alluded to herein above. For example, the signature can be decrypted using the corresponding public key of the encryption entity. The resulting decryption will provide the hash value that was initially associated with the file, for example, by way of a SHA-1 hash algorithm. A similar hash value can then be determined at the location of the image generation environment 410 using the identical hash algorithm, e.g., SHA-1. The two hash values can be compared and should be identical. If the hash values are not identical, then the system specification file has become corrupted, maliciously or otherwise. In that case, system specification file 216 cannot be authenticated by block 514.

If system specification file 216 cannot be authenticated, then any number of actions can be taken to alert various components of image generation environment 410 to take remedial action regarding the specific system specification file. For example, the sending data center 106 can be alerted that a received system specification file was not authenticated and data store 202 can be itself checked for integrity. Various other possibilities regarding remedial action are possible to alert the various elements involved in the generation and transmission of the system specification file of potential malfeasance. Nevertheless, from the perspective of the computing node 120 that is tasked with processing the specific system specification file 216, the process stops, perhaps after alerting user 110. Consequently, after possibly some notification processing, the process of FIG. 5 stops at block 516.

In the event that the system specification file 216 is authenticated at block 514, processing continues. According to an embodiment, the process makes a determination at block 518 regarding the presence of a preexisting image in cache 114. In some instances, another user of a program execution environment 108 may have previously requested the same or a substantially similar system specification file to be launched by image generation environment 140. In that case, a snapshot 418 of a binary system image may already exist in image cache 114. If the binary system image contained in snapshot 418 is available for use, then, rather than generate a new binary system image from system specification file 216, snapshot 418 in the cache may be launched on user VM computing node 120b. Using an existing snapshot 418 would obviate the need to continue processing system specification file 216 to generate a new snapshot 418. Nevertheless, regardless of whether a preexisting snapshot 418 is available for use, in some embodiments, it may be desirable to continue processing system specification file 216 to determine whether the various components and resources that make up the preexisting snapshot 418 are still authorized. It may also be the case, that there is a usable snapshot of a binary system image in image cache 114, but the particular user may not be authorized to use some or all of the resources that comprise the binary system image. As such, in some embodiments, some processing of system specification file 216 may continue whether or not a compatible image is found in image cache 144 at block 518.

The process for determining whether a compatible binary system image is in a snapshot 418 in image cache 418 may require continued processing of system specification file 216 to determine the various components. In that case, it may be determined that a substantially similar binary system image exists in a snapshot 418 in image cache 114 but that additional processing will be required to either update the binary system image or to add additional resources to it. For example, a snapshot 418 of a binary system image may exist that has a subset of the resources that are specified in a system specification file but that additional resources are required. Although the preexisting snapshot of the binary system image may not have all of the resources required, it may be more computationally economical to add the additional resources to an existing snapshot 418 than to recreate the entire binary system image from scratch. In one embodiment, snapshot 418 can be re-executed by computing node 120a and updated or to add additional resources before being added back to the image cache 114.

As an alternative embodiment, system specification file 216 may be associated with an indicator or other metadata that allows for an easy identification of a compatible snapshot 418 in image cache 114. For example, a code could be embedded in system specification file 216 or in the file name of system specification file 216 that would assist the image generation environment 410 with a computationally efficient mechanism to identify a snapshot 418 containing a binary system image that is compatible or substantially compatible with system specification file 216. In addition, in an embodiment, each snapshot 418 may have associated metadata that provides an indication of all of the components that have been incorporated to each snapshot 418. Cross-referencing the metadata of a system specification file 216 with the metadata for a snapshot 418 provides one method for determining compatibility or substantial compatibility.

In the event that a compatible or substantially compatible binary system image is identified in image cache 114, then at block 520 the identified snapshot 418 is retrieved from image cache 114 and caused to execute on a user's computing node such as User VM 120b at block 522. Of course, user's VM 120b should have been determined to be substantially compatible with hardware specification file 416 or a computing node that conforms to the hardware specification file is first instantiated.

In the event that no compatible snapshot 418 is found in image cache 114, then the process of parsing system specification file 216 proceeds. Referring to FIG. 2 in conjunction with FIG. 5, at block 524, the resource references e.g., 220, 230 and 238 are parsed and extracted from system specification file 216. The references, e.g., 220, 230 and 238, may point to or otherwise identify the operating system and other applications and data that should form part of the binary image file. Computing node 120 processes the references to determine where to retrieve the resources. The signatures associated with the various references, e.g., 224, 226, 228, 232, 234, and 236, can be checked at block 526.

In an embodiment, the process of checking the signatures comprises checking a user trust store 112b. The location of user trust store 112b can be specified by the user at some point in the process of launching image generation process 410. In an alternative embodiment, the location of user trust store 112b can be determined based on information associated with the user. For example, the user's account may provide information regarding the location of user trust store 112b. The user's identity could also be used. In one example, the user may be associated with a company, entity, or user group that provides additional information that may be used to determine the location of user trust 112b.

User trust store 112b may be used by a user or an entity responsible for the user to determine whether various resources are permitted to be incorporated into a binary system image that is usable by the particular user or for a particular entity with which the user is associated. As indicated herein above, the signatures may use a public key/private key infrastructure such as an X.509 certificate. In some embodiments, user trust store 112b may be used for resources that are from a particular entity with which the user is associated. In that case, user trust store 112b would contain the information that is used by that entity to provide permission to a user to incorporate the resource into the binary system image. For example, the entity may author a particular portion of a binary system image such as an internal resource. The entity can then calculate a signature for the particular internal resource by cryptographically signing a hash (e.g., a SHA-1 hash) of the resource using the certificate private key that can later be used to demonstrate that authenticity of the internal resource to detect tampering or forgery.

In another embodiment, a system trust store 112a can also be used, either alone or in combination with user trust store 112b, to provide authentication of a particular resource and provide the permission for the resource to be incorporated into the binary system image. System trust store 112a may not be associated with the user but rather may be associated with the overall data center or program execution environment as a check to determine whether particular resources are authorized to be incorporated into binary system images.

In some embodiments, user trust store 112b and system trust store 112a comprise a positive authority and a negative authority. The positive authority may be used to indicate that a particular resource can be incorporated into a binary system image. In some embodiments a negative authority may be used as an added check. A negative authority may provide an indication that a particular signature is not authorized regardless of the fact that it is listed by a positive authority. In an embodiment, a signature may be authenticated if a signature appears in either the user positive trust store or the system positive trust store and does not appear in either the user negative trust store or the system negative trust store.

In an embodiment, a resource reference in system specification file 216 may be unsigned. For example, the signature associated with the resource may comprise a null or special character that indicates that the resource reference is unsigned. In that case, a user authentication may be provided. For example, the user may be asked to vouch for permission to incorporate the resource into the binary system image. Such user authentication may take the form of a simple authorization or may take the form of a challenge-response prior to authentication based on user input.

Upon verification of the resource signatures, a base system image is created. That would generally entail installing a specified operating system and version on the image generation computing node 120a. In some instances, base system images for a number of operating systems and versions will be available in the form of a snapshot 418 in image cache 114. As such, the base image can be launched on the computing node 120a without the need to install an operating system.

In box 530, after the proper base system image is formed on computing node 120a, other specified resources can be incorporated into the base image to form binary system image 412. In one embodiment, the resources indicated in systems specification file 216 are copied into content store so as to be accessible to the computing resource 120a. After the resources are copied into content store 414, a script is run on the base image to incorporate the resources into the base image.

At this point, the computing node 120a comprises a binary system image corresponding to the binary system image specified by system specification file 216. Image generation computing node 120a can then take a snapshot 418 of the binary system image and store that snapshot 418 in image cache 114. Snapshot 418 of the binary system image thus created can thereafter be retrieved from the image cache 114 as indicated by box 520 and executed on the user computing node as indicated by box 522.

In an embodiment, snapshot 418 that is stored in image cache 114 can be made public or private. For example, the user or entity that the user is associate with can designate that the use of the binary system image created by the snapshot should have restricted access. If the access is restricted, then the particular binary system image snapshot will not be accessible to some set of users.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth.

Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method for enhancing the efficiency of a network, comprising:
    generating a file containing references to components of a computer system image, the components including a base system image and a resource, the file also containing at least a signature associated with the resource; and
    after generating the file, transmitting the file over a network to cause the computer system image to be executed on a destination computing device based at least in part on the references to components contained in the file, wherein the destination computing device at least authorizes the resource to be incorporated into the computer system image by verifying the signature and ensures that the resource is incorporated into the computer system image.

2. The method as recited in claim 1 wherein the generating of the file comprises selecting a preexisting file that is based at least in part on a first computer system image having predefined characteristics.

3. The method as recited in claim 2 wherein the selecting of the preexisting file comprises selecting the preexisting file from a plurality of files classified according to a classification.

4. The method as recited in claim 1 wherein generating the file comprises adding an indicator of an image generation procedure to use in generating the computer system image.

5. The method as recited in claim 1 wherein generating the file comprises adding an indicator of an operating system to include in the computer system image.

6. The method as recited in claim 1 wherein generating the file comprises adding a reference to a resource that is external to the file.

7. A system for enhancing the efficiency of a network, comprising:
    a processor;
    a memory in electronic communication with the processor, the memory having stored thereon computer-readable instructions that upon execution by the processor at least:
        generate a file containing references to components of a computer system image, the components including a base system image and a resource, the file also containing at least a signature associated with the resource; and
        submit the file for transmission over a network to cause the computer system image to be executed on a destination computing device based at least in part on the references to components contained in file, wherein the destination computing device at least authorizes the resource to be incorporated into the computer system image by verifying the signature and ensures that the resource is incorporated into the computer system image.

8. The system as recited in claim 7 wherein the memory having stored thereon computer-readable instructions that upon execution by the processor at least generate a file further comprises instruction that at least select a preexisting file that is based at least in part on a first computer system image having predefined characteristics.

9. The system as recited in claim 8 wherein the memory having stored thereon computer-readable instructions that upon execution by the processor at least select a preexisting file from a plurality of files classified according to a classification.

10. The system as recited in claim 7 wherein the memory having stored thereon computer-readable instructions that upon execution by the processor at least add an indicator of an image generation procedure to use in generating the computer system image.

11. The system as recited in claim 7 wherein the memory having stored thereon computer-readable instructions that upon execution by the processor at least add an indicator of an operating system to include in the computer system image.

12. The system as recited in claim 7 wherein the memory having stored thereon computer-readable instructions that upon execution by the processor at least add a reference to a resource that is external to the file.

13. The system as recited in claim 12 wherein the memory having stored thereon computer-readable instructions that upon execution by the processor at least add a signature for the reference to the resource that is external to the file.

14. The system as recited in claim 7 wherein the destination computing device is configured to launch a virtual machine to execute the computer system image.

15. An apparatus for enhancing the efficiency of a network, comprising:
    a storage device having stored thereon a plurality of files, each of the plurality of files containing references to components of a computer system image, the components including a base system image and a resource, the file containing at least a signature associated with the resource; and
    at least one computing device having a memory to configure a processor at least to:
        retrieve at least one file from the plurality of files; and
        transmit the at least one file over a network to cause the computer system image to be executed on a destination computing device based at least in part on the references to components contained in the at least one file, wherein the destination computing device at least authorizes the resource to be incorporated into the computer system image by verifying the signature and ensures that the resource is incorporated into the computer system image.

16. The apparatus as recited in claim 15, the at least one computing device further configured at least to select the file for retrieval from the plurality of files based at least in part on a first computer system image having predefined characteristics.

17. The apparatus as recited in claim 15, the at least one computing device further configured at least to select the file for retrieval from the plurality of files based at least in part on a classification of system type associated with the file.

18. The system as recited in claim 15, the at least one computing device further configured to generate the at least one file by adding an indicator of an image generation procedure to use in generating the computer system image and storing the at least one file on the storage device.

19. The system as recited in claim 15, the at least one computing device further configured to generate the at least one file by adding an indicator of an operating system to include in the computer system image and storing the at least one file on the storage device.

20. The system as recited in claim 15, the at least one computing device further configured to generate the at least one file by adding a signature for a reference to a resource that is external to the file and storing the at least one file on the storage device.

* * * * *